United States Patent Office 2,986,570
Patented May 30, 1961

2,986,570
EPOXYLATED ETHERS OF ACETYLENIC ALCOHOLS
Roger F. Monroe and Arthur W. Anderson, Midland, Mich., assignors to The Dow Chemical Company, Midland, Mich., a corporation of Delaware
No Drawing. Filed Mar. 3, 1958, Ser. No. 718,474
6 Claims. (Cl. 260—348)

The present invention relates to epoxylated ethers of acetylenic alcohols and is more particularly concerned with epoxy propoxy chloro propyl ethers of acetylenic alchols having the formula

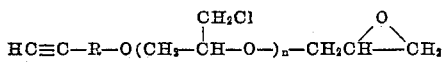

wherein R represents a bivalent aliphatic hydrocarbon radical containing from 1 to 8 carbon atoms, inclusive, and $n$ represents an integer from 1 to 100 or more. The term aliphatic as herein employed includes cycloaliphatic compounds. These compounds have been tested and found to be useful as the active ingredient in compositions employed in the control of undesirable vegetation. These compounds also have been found to be useful as the active ingredient for the inhibition of corrosion in acidic solutions.

The compounds of the present invention conveniently may be prepared by reacting a 2-hydroxy-3-chloropropyl ether of an acetylenic alcohol (prepared in accordance with our copending application Serial No. 718,473 filed even date herewith now Patent No. 2,946,825) with epichlorohydrin in the presence of an alkali metal or alkaline earth metal hydroxide. Alternatively, epichlorohydrin may be reacted with the acetylenic alcohol in the presence of a metal halide, such as stannous chloride, zinc chloride, or boron trifluoride and subsequently treated with an alkali metal or alkaline earth metal hydroxide. The reaction proceeds smoothly at temperatures of from room temperature to about 100° C. Upon completion of the reaction the desired product may be obtained in conventional manner such as fractional distillation under reduced pressure. When it is desired to obtain the mono-epoxylated compounds, i.e. wherein the integer $n$ is 1, good results are obtained when the ether is employed in a molar excess. When it is desired to obtain the poly epoxylated compounds, i.e., the integer $n$ represents 2 to 100 or more, good results are obtained when employing the epichlorohydrin reactant in a slight, excess over that theoretically necessary to obtain the desired average value of $n$.

The compounds of the present invention may be employed in the preparation of polymeric compounds having the following general formula

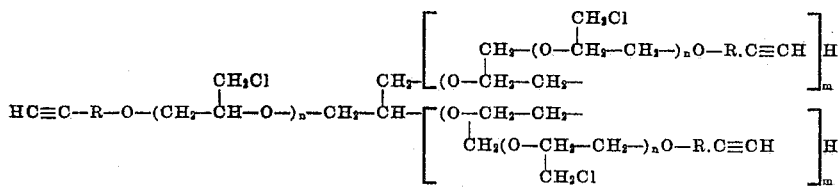

by reacting the compounds of the present invention

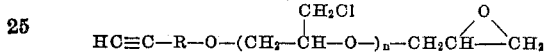

in the presence of a caustic with an alcohol such as the glycol of the compound shown above or any mono or polyhydric alcohol. Thus the reaction may be shown as follows:

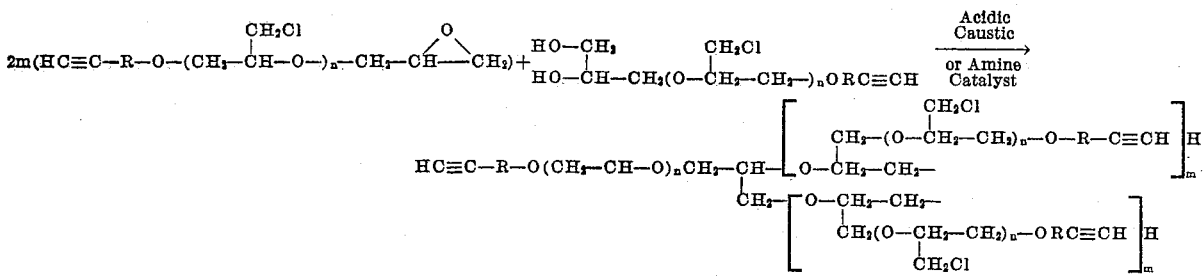

Thus a whole new genus of polymeric compounds is prepared having acetylenic substituents which are useful as acid acceptors, crosslinking agents in polymer chemistry and as cross-linking or homopolymerizable compounds per se.

It is also to be understood that the compounds of the present invention can be hydroxylated to the corresponding glycols by treating the product with sodium hydroxide and water. Thus

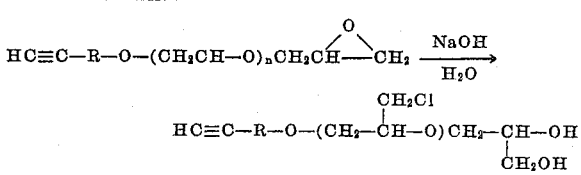

The following examples illustrate the present invention but are not to be construed as limiting.

*Example 1*

1375 parts by weight (14.9 moles) of epichlorohydrin were added slowly to 2417 parts by weight (19.5 moles) of 1-ethynyl cyclohexan-1-ol containing 10 parts by weight of anhydrous stannic chloride with stirring and at a temperature of between 50° C. and 65° C. The temperature was maintained by external cooling. The mixture was stirred to 60 minutes longer. Upon completion of the reaction the reaction mixture was admixed with 800 parts by weight (20 moles) of sodium hydroxide in a 50 percent solution. Within an hour after treating with sodium hydroxide an upper oil layer which formed was washed with water and fractionated under reduced pressure to obtain a fraction boiling at 116° C. at 20 mm. This fraction was identified as a 1-chloro-2-(2,3-epoxy propoxy)-3-(1-ethynyl cyclohexyloxy)propane product.

*Example 2*

1375 parts by weight (14.9 moles) of epichlorohydrin were added slowly with stirring to 1680 parts by weight (20 moles) of methyl butynol containing 10 parts by weight of anhydrous stannic chloride and at a temperature of between 50° C. and 65° C. The mixture was maintained at the temperature of 50° C. and 65° C. by external cooling. Upon completion of the reaction the reaction mixture was admixed with 800 parts by weight (20 moles) of sodium hydroxide in a 50 percent solution. Thereafter following the procedure of Example 1 the upper oil layer which formed was washed with water and fractioned under reduced pressure to obtain 1-chloro-3 - (1,1 - dimethylpropynyloxy) - 2 - (2,3 - epoxypropoxy)propane product boiling at 116° C. at 2.0 mm.

*Example 3*

In the manner of Example 1 employing 1375 parts by weight (14.9 moles) of epichlorohydrin, 1700 parts by weight (13.5 moles) of dimethyl hexynol containing 10 parts by weight of anhydrous stannic chloride there was obtained 1-chloro-2-(2,3-epoxypropoxy)-3-(1-isobutyl-1-methyl-propynyloxy)propane product boiling at 115° C. at 0.9 mm.

*Example 4*

In a like manner employing 2200 parts by weight (24 moles) of epichlorohydrin, 1900 parts by weight (34 moles) of propargyl alcohol containing 10 parts by weight of anhydrous stannic chloride there was obtained 1-chloro-2-(2,3-epoxypropoxy) - 3 - propargyloxy propane product boiling at 110° C. at 1.0 mm.

It is thus apparent that substantially any acetylenic alcohol may be employed in accordance with the present invention. Thus, one can employ 3-butyn-1-ol, 4-pentyn-1-ol, 2-hexyn-1-ol, 5-heptyn-1-ol and the like in addition to the alcohols described in the examples. These same alcohols may be employed in the preparation of the ether compounds employed as starting materials as hereinbefore described. The ethers there described can be derived in the manner of our copending applications Serial Nos. 718,470 and 718,473 filed even date herewith.

The ether compounds above mentioned can be prepared by reacting epichlorohydrin with about a molar proportion, and preferably with up to a 30 percent excess of an acetylenic alcohol at a temperature below about 80°, recovering the appropriate 2-hydroxy-3-chloroalkyl ether of the acetylenic alcohol and reacting this product with an alkali metal or alkaline earth metal hydroxide at a temperature of from about room temperature to about 100° C. The appropriate 2,3-epoxypropyl ether of the acetylenic alcohol may be recovered in conventional manner such as fractional distillation under reduced pressure.

The compounds of the invention are useful as herbicides and may be employed for the control of undesirable vegetation. For such use the compounds may be dispersed on a finely divided carrier and employed as dusts. The new compounds may also be employed in oils, or as constituents in water emulsions or water dispersions with or without a wetting, dispersing or emulsifying agent. In a representative operation, substantially complete controls of *Phalarisis canaries* was obtained with aqueous compositions containing 100 parts by weight of 1-chloro-2-(2,3-epoxypropoxy)-3-(1-isobutyl-1-methyl propynyloxy) propane per million parts by weight of ultimate mixture.

We claim:

1. An epoxylated ether of an acetylenic alcohol having the formula

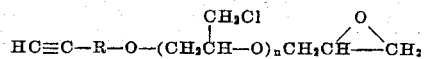

wherein R represents a bivalent aliphatic hydrocarbon radical having from 1 to 8 carbon atoms and $n$ is an integer from 1 to 100, inclusive.

2. 1-chloro-2-(2,3-epoxy propoxy)-3-(1-ethynyl cyclohexyloxy)propane.

3. 1-chloro-3-(1,1-dimethylpropynyloxy)-2-(2,3-epoxypropoxy)propane.

4. 1-chloro-2-(2,3-epoxypropoxy)-3-(1-isobutyl-1-methyl-propynyloxy)propane.

5. 1-chloro-2-(2,3-epoxypropoxy)-3-propargyloxy propane.

6. An epoxylated ether of an acetylenic alcohol having the formula

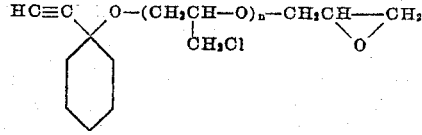

wherein $n$ is an integer from 1 to 100, inclusive.

References Cited in the file of this patent

FOREIGN PATENTS 751,244    Great Britain _____ June 27, 1956